June 8, 1937.  A. HALL  2,082,956
SAFETY NUT
Filed April 18, 1936
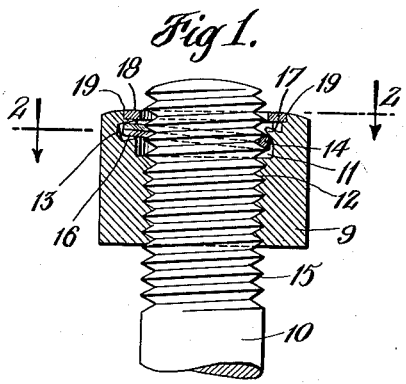
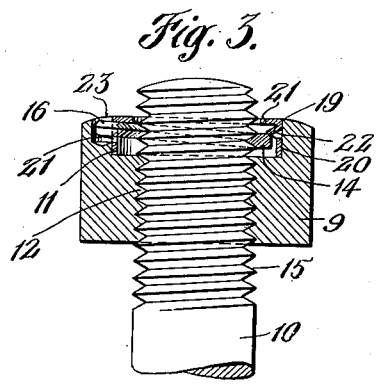
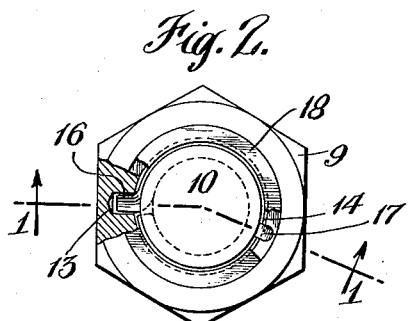
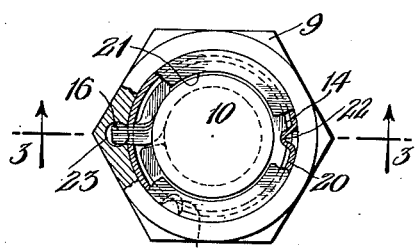
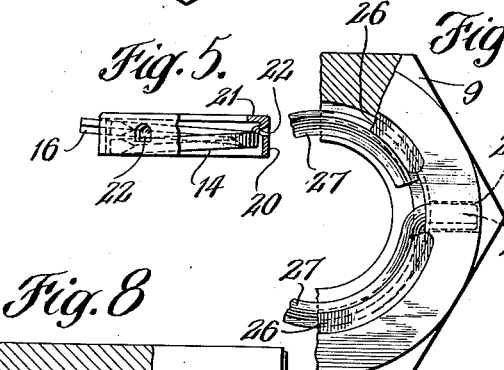
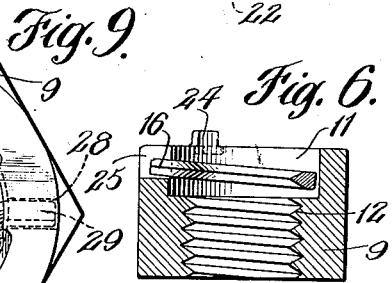
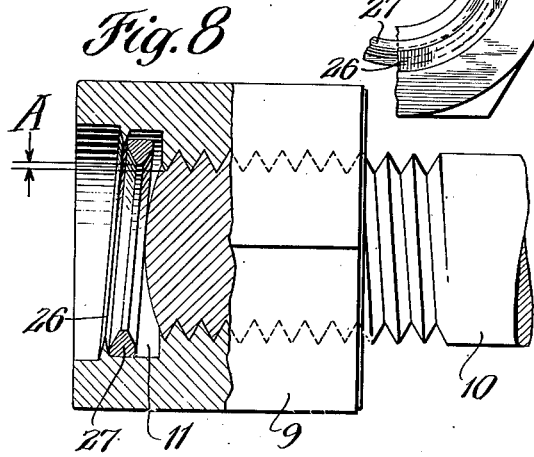
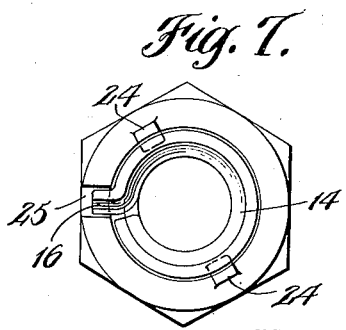
INVENTOR
Albert Hall
BY
Synnestvedt & Lechner
ATTORNEYS Patented June 8, 1937

2,082,956

UNITED STATES PATENT OFFICE 2,082,956

SAFETY NUT

Albert Hall, Narberth, Pa., assignor to James H. Gravell, Elkins Park, Pa.

Application April 18, 1936, Serial No. 75,062

3 Claims. (Cl. 151—14)

This invention relates to a lock or safety nut, i. e., one which will resist unintentional unscrewing movement, and it is particularly concerned with an improved article of this nature as well as with a method of making it.

This application is a continuation in part of my application Serial No. 27,279 filed June 19, 1935.

The invention is in the nature of an improvement upon the basic ideas disclosed and claimed in my previous patents, No. 1,909,400, issued May 16, 1933, and No. 1,929,169, issued October 3, 1933. In fact the locking feature employed in the present invention is of the same nature as that disclosed in the patents referred to, and I make no claim herein to the locking feature per se but only to the improved article in accordance with the following disclosure and the method by which it is made.

The primary object of the invention is to provide a safety nut of the character described in which the locking band is loosely though positively retained in proper position within the nut itself, so that the nut and the band constitute one article of manufacture.

It is also an object of my invention to provide a nut of improved construction which can be readily used in forming the combined nut and brake. In other words, I provide a nut, as an article of manufacture, which is capable of use in the production of a safety nut of the character herein disclosed.

Another object of the invention is to provide a lock nut in which the brake band is held in proper position for threading upon the bolt so that there will be no danger of crossing the threads at the time of applying the nut to the bolt.

A still further object is to provide a lock nut of the character described in which the brake band recess is placed in the outer face of the nut so as to reduce the length of travel of the brake band on the bolt. This is important in instances where it is necessary to unscrew or remove the nut by means of a wrench because such unscrewing movement takes considerable power and is also liable to cause wear on the threads, so that it is a distinct advantage to reduce the distance over which the brake band travels.

I also provide a locking unit which can be inserted into a suitable recess formed in a face of the nut.

In connection with all of the foregoing objects it is another object of the invention to provide an improved lock nut of the character described which presents substantially the appearance of an ordinary nut.

A still further object of the invention is to provide a method for manufacturing lock nuts of the character herein described.

The foregoing, together with such other objects as are incident to my invention or which may appear hereinafter, are obtained by means of a method and construction which is illustrated in preferred forms in the accompanying drawing, wherein—

Figure 1 is a vertical cross section through a nut embodying my improvements, taken as indicated by the line 1—1 in Figure 2.

Figure 2 is a section on the line 2—2 of Figure 1.

Figure 3 is a vertical section similar to that of Figure 1 but illustrating a modified form of the invention, the section being taken on the line 3—3 of Figure 4.

Figure 4 is a plan view of Figure 3 with portions broken away and in section to illustrate details.

Figure 5 is a partial section and partial side elevation of the locking unit used in the construction of Figures 3 and 4.

Figure 6 is a vertical section through another modified form of locking nut embodying the present invention.

Figure 7 is a plan view of the nut of Figure 6.

Figure 8 is a view partly in section and partly in elevation illustrating a modification of the nut as well as a modified form of brake band; and Figure 9 is a fragmentary end view of the construction illustrated in Figure 8 looking toward the right with a small portion broken away.

Referring in the first instance to Figures 1 and 2 it will be seen that I have illustrated an internally threaded nut 9 which is adapted to cooperate with an externally threaded bolt 10 or similar member, and in the following description and claims I wish it to be understood that when I refer to a nut or a bolt I intend to include any equivalent correspondingly threaded members adapted to cooperate with each other in the manner in which a nut and bolt cooperate with each other.

In the outer face of the nut is formed a brake band cavity or recess 11 which, as shown, is concentric with the threaded opening 12 in the nut and which is of substantially greater diameter or dimension than the diameter of the threads. This recess, therefore, surrounds the bolt opening and since it is located in the outer face of the nut it is obvious that the brake band will have to travel over a less number of the threads on the bolt than it would were the recess located on the under face of the bolt. However, while I prefer this construction it is not essential to a realization of the invention and I do not wish to be limited to this particular embodiment.

In the wall of the recess 11 I drill a laterally extending opening or hole 13 which may make any convenient angle with respect to the axis of the nut. In the embodiment of Figures 1 and 2 this hole 13 is formed by means of a drill working through the open face of the recess 11, so that the axis of the hole 13 is at a slight angle with respect to the horizontal as clearly shown in Figure 1.

Into the recess 11 I place a suitable locking or brake band 14 which, in the present instance, is formed as a spiral element with an interior wedge-shaped portion adapted to project into the adjacent threads 15 on the bolt 10. I wish it to be understood, however, that this band can take any one of a number of different shapes in accordance with the detailed disclosures contained in my previous patents already referred to. I prefer, however, to use the wedge-shaped construction illustrated and to make the spiral of the locking band correspond to the pitch of the threads, so that when the nut is applied the locking band, in effect, becomes a continuation of the threads in the nut.

It is also to be noted that the brake band illustrated in Figures 8 and 9, (to be described later) can be used in any of the forms of nut illustrated and that the form of brake band illustrated in Figures 1 to 7 can be used in the construction illustrated in Figures 8 and 9.

The brake band is provided with a lateral extension 16 adapted to project into the opening or hole 13.

After the locking band has been inserted it is, of course, free to float slightly in the recess 11 and in order to guide it so that it will thread properly on the bolt as the end of the bolt advances through the nut during a tightening operation, I punch out a positioning lug 17 which is so located as to hold the brake band in the correct angular position necessary to avoid jamming or crossing the threads The lug 17 cooperates with the extension 16 in the hole 13 to accomplish this end, but I wish to point out that more than one positioning lug 17 might be employed if desired, although I have found that one such lug, when located with respect to the opening 13 approximately as indicated in Figures 1 and 2, will satisfactorily perform the desired function.

After the locking band is in proper position and the lug 17 formed as indicated, I place over the end of the opening 11 a facing washer 18 which can be secured in position in any desired manner, preferably by a slight peening of the edge of the opening as indicated at 19.

The internal diameter of the locking band is, of course, substantially equal to the diameter of the threads while its external diameter is less than the diameter of the recess 11, so that the band is free to expand in the recess 11 during unlocking movement in accordance with the principle of operation of a locking band of this type as fully described and claimed in my previously issued patents above referred to. Suffice it to say, for the purposes of this case, that the band acts as a brake and grips the bolt 10 upon attempted unscrewing movement of the nut 9, but during movement of the nut in the direction which tightens it upon the bolt 10 the band tends to expand and free itself of the bolt in order to permit such tightening movement.

The principles involved in the modification of Figures 3 to 5 inclusive are just the same as those which are involved in the structure of Figures 1 and 2, but in Figures 3 to 5 I have provided what might be termed a locking unit which can be inserted in a properly formed recess in the face of the bolt. The locking unit comprises a sleeve-like ring 20 having an annular inturned lateral extension or shoulder 21 and into this ring I place a locking band 14 of the same nature as shown in Figures 1 and 2. The wall of the ring is provided with an opening or hole 21 through which the lateral end extension 16 of the brake band is adapted to project.

The ring is punched inwardly at one or more points as shown at 22, in order to provide suitable lugs corresponding to the lugs 17 in Figures 1 and 2 for the purpose of properly positioning the locking band 14 in accordance with the desciption already given in connection with Figures 1 and 2.

The unit just described is then inserted in the recess 11 in the outer face of the nut with the end 16 fitting into a suitable opening 23 which may be drilled downwardly from the outer face of the nut or, if desired, formed as an outwardly extending slot such, for example, as is shown in Figures 6 and 7 to be described below. I prefer, however, to utilize the hole shown because this breaks up to a less extent the integrity of the outer walls of the nut. The unit 20 after insertion is held in place in any suitable manner, preferably by peening 19 as before described.

With this arrangement the nut gives substantially the appearance of an ordinary nut except for the small opening 23.

A simple form of the invention is shown in Figures 6 and 7. In these two figures I have shown two oppositely disposed, axially projecting luglike portions 24 which are deformable into the position shown in dotted lines after the band has been inserted in the cavity or recess 11. When so deformed, they, of course, will serve to retain the band loosely within the recess so that it will not become separated from the nut. In these figures the lateral opening for the reception of the end 16 of the locking band takes the form of a slot 25. This embodiment, however, is not a preferred one because it does not provide a positioning means for guiding the band onto the bolt although with care in applying the nut it is possible to use an arrangement which is as simple as that illustrated in these two figures.

In Figures 8 and 9 I have illustrated a modified form of nut and also a modified form of brake band. In the arrangement shown in these figures the metal is punched or sheared from the side wall of the recess in the top of the nut to form a spiral positioning and retaining ring 26 with a pitch equal to the pitch of the threads of the bolt. This ring functions in a manner similar to that described in connection with the positioning lugs 17 or 22 to hold the brake band 27 loosely in the proper position to enter and follow the threads of the bolt. This ring also prevents the brake band from falling out of the recess and provides a facing therefor similar to that which is provided by the separate washer 18 shown in Figures 1 and 2 although not quite so neat in appearance because its outer surface is not flush with the end face of the nut. The hole 28 in the side of the nut into which the neck 29 of the brake band enters must of course be so located with reference to the threads of the nut as to cooperate with the ring 26 in holding the band in the proper pitch relation with respect to the threads of the bolt as the nut 9 advances.

Since the brake band 27 is free to float slightly in the recess 11, if the nut 9 is held on its side as shown in Figure 8 the band will drop down and rest on the side wall of the recess. In this position the inside of the brake band 27 at the top, with the type of brake band shown in Figures 1 to 7 inclusive, would be a distance A below the root diameter of the threads of the bolt and therefore the band would bear against the end of the bolt as the nut advances and in some instances might not enter properly onto the threads of the bolt. With the type of brake band shown in Figure 8, however, this difficulty is overcome. With this type of band the inside diameter has been increased by cutting away the sharp inside point of the V of the band to such point that with the parts in the position of Figure 8 and with the nut on its side as shown, the inner circumference of the brake band will stand outside the root diameter of the bolt and therefore will readily enter the threads of the bolt as the nut advances. The operation of this type of brake band, however, will be essentially the same as that of the type shown in the other figures and it will be understood that the brake band of this construction could be used in place of the band shown in any of the other figures.

It is obvious, of course, that other means may be employed for retaining the brake band in its proper position in the cavity 11 and it is the intention to include within the scope of this disclosure any such equivalent means which come within the terms of the appended claims.

In arrangements such as shown in Figures 6 and 7 I prefer to make the retaining projections or lugs 24 as an integral part of the metal of the nut itself and of course the peening at 19 shown in some of the other figures is also formed of the metal of the nut itself, and in the appended claims the expressions "deform" or "deformed" are intended to include within their scope any equivalent bending, shearing, swaging or rolling action as involves a displacement of an integral portion of the metal of the nut to a position overhanging the brake lock recess as and for the purposes described.

I claim:

1. As a new article of manufacture, a threaded lock nut having a recess in a face thereof surrounding the bolt opening, a brake band in said recess of less dimension than the recess and of spiral formation corresponding to the pitch of the bolt threads and adapted to screw thereon, cooperating interengaging means on the band and on the wall of the recess for preventing rotation of the band, said band being free to float slightly in the recess both longitudinally and transversely of the bolt opening, and means projecting from the wall of the recess to overhang the band and spirally disposed to correspond to the pitch of the threads, said means for preventing rotation of the band cooperating with said spirally projecting means so as to properly position the band and insure its entry into the threads of the bolt as it advances into the nut.

2. The article of claim 1 wherein the band is formed with an inside diameter sufficiently great to stand outside the plane of the root diameter of the bolt threads regardless of the position of the band in the bolt recess.

3. As a new article of manufacture, a threaded lock nut having a recess in a face thereof surrounding the bolt opening, an opening extending laterally from the recess, a brake band in said recess of less dimension than the recess and of spiral formation corresponding to the pitch of the bolt threads and adapted to screw thereon, said band having one end extended laterally to project into said lateral opening but with the other end free in the recess and said band being free to float slightly in said recess both longitudinally and transversely of the bolt opening, and means projecting from the wall of the recess to overhang the band and spirally disposed to correspond to the pitch of the threads, said overhanging projecting means and said lateral opening with the end of the band which is extended thereinto being arranged to cooperate so as to position the band in the nut and insure proper threading thereof on the bolt threads as the bolt advances into the nut.

ALBERT HALL.